(12) United States Patent
Oliver et al.

(10) Patent No.: US 7,926,111 B2
(45) Date of Patent: *Apr. 12, 2011

(54) DETERMINATION OF RELATED ENTITIES

(75) Inventors: Ian Oliver, Manly Vale (AU); Ryan Pereira, Cremorne (AU)

(73) Assignee: Symantec Corporation, Mountain View, CA (US)

( * ) Notice: Subject to any disclaimer, the term of this patent is extended or adjusted under 35 U.S.C. 154(b) by 943 days.

This patent is subject to a terminal disclaimer.

(21) Appl. No.: 11/707,425

(22) Filed: Feb. 16, 2007

(65) Prior Publication Data

US 2007/0220043 A1  Sep. 20, 2007

Related U.S. Application Data

(60) Provisional application No. 60/783,242, filed on Mar. 17, 2006.

(51) Int. Cl.
*H04L 29/00* (2006.01)

(52) U.S. Cl. .......................................... 726/24; 707/103

(58) Field of Classification Search .............. 726/22–25; 707/103
See application file for complete search history.

(56) References Cited

U.S. PATENT DOCUMENTS

| | | | |
|---|---|---|---|
| 7,281,270 B2 * | 10/2007 | Piesco et al. | 726/25 |
| 2002/0112185 A1 * | 8/2002 | Hodges et al. | 713/201 |
| 2007/0067842 A1 * | 3/2007 | Greene et al. | 726/24 |
| 2007/0214503 A1 * | 9/2007 | Shulman et al. | 726/22 |

\* cited by examiner

*Primary Examiner* — Vivek Srivastava
*Assistant Examiner* — Anthony Brown
(74) *Attorney, Agent, or Firm* — Holland & Hart LLP

(57) ABSTRACT

A method/system for determining a group of related entities of interest in one or more processing systems. The method comprises identifying a starting entity from one or more entities in the one or more processing systems, then obtaining, based on an entity type of the starting entity, a first set of rules for determining at least one other related entity, and then determining, using the first set of rules, the at least one related entity.

16 Claims, 9 Drawing Sheets

DETERMINATION OF RELATED ENTITIES

TECHNICAL FIELD

The present invention generally relates to a method, system and/or computer readable medium of instructions for determining a group of related entities of interest in one or more processing systems.

In one non-limiting form, the present invention relates to determining a group of malicious related entities in one or more processing systems.

BACKGROUND ART

As used herein a "threat" comprises malicious software, also known as "malware" or "pestware", which comprises software that is included or inserted in a part of a processing system for a harmful purpose. The term threat should be read to comprise possible, potential and actual threats. Types of malware can comprise, but are not limited to, malicious libraries, viruses, worms, Trojans, adware, malicious active content and denial of service attacks. In the case of invasion of privacy for the purposes of fraud or theft of identity, malicious software that passively observes the use of a computer is known as "spyware".

In a networked information or data communications system, a user has access to one or more terminals which are capable of requesting and/or receiving information or data from local or remote information sources. In such a communications system, a terminal may be a type of processing system, computer or computerised device, personal computer (PC), mobile, cellular or satellite telephone, mobile data terminal, portable computer, Personal Digital Assistant (PDA), pager, thin client, or any other similar type of digital electronic device. The capability of such a terminal to request and/or receive information or data can be provided by software, hardware and/or firmware. A terminal may comprise or be associated with other devices, for example a local data storage device such as a hard disk drive or solid state drive.

An information source can comprise a server, or any type of terminal, that may be associated with one or more storage devices that are able to store information or data, for example in one or more databases residing on a storage device. The exchange of information (i.e. the request and/or receipt of information or data) between a terminal and an information source, or other terminal(s), is facilitated by a communication means. The communication means can be realised by physical cables, for example a metallic cable such as a telephone line, semi-conducting cables, electromagnetic signals, for example radio-frequency signals or infra-red signals, optical fibre cables, satellite links or any other such medium or combination thereof connected to a network infrastructure.

An entity can comprise, but is not limited to, a file, an object, a class, a collection of grouped data, a library, a variable, a process, and/or a device.

A problem faced by the computer system industry is how to determine which entities in a processing system are related. In some instances, entities are related by interacting, directly and/or indirectly, with each other to achieve a specific result or function.

For example, this problem can occur during the detection of malware in a processing system. Due to malware changing rapidly as new versions or modifications of malware infect processing systems, malware scanners and detectors need to be continually updated to determine which entities are considered malicious. The continual maintenance of the malware scanner can be a time-consuming task for users of processing systems as well as the manufactures of the software. Furthermore, most malware scanners only detect malware which the software has already been configured to detect. Therefore, when modified malware infects a processing system which is undetectable by the malware scanner, there is no easy process for the malware scanner, or a user of the processing system to determine which entities in the processing system are related and considered malicious.

Another example illustrating the problem of determining related entities in a processing system occurs in computer programming. For example, a computer programmer may need to determine which files, system variables, registry keys, header files and third party programs are required to generate a software module, such that the software module comprises all necessary components to compile and execute correctly. Although the task of determining the related entities can be manually performed by the computer programmer, this is a time-consuming task and requires an indepth knowledge of the structure of the entities in the processing system in order to be successfully performed.

There are a number of other such areas related to processing systems where the problem of determining related entities in a processing system arises.

Therefore, there exists a need for a method, system and/or computer readable medium of instructions to determine a group of related entities in a processing system which addresses or at least ameliorates problems inherent in the prior art.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

DISCLOSURE OF INVENTION

In one broad form, the present invention provides a method of determining a group of related entities of interest in one or more processing systems, wherein the method comprises the steps of:
 (a) identifying a starting entity from one or more entities in the one or more processing systems;
 (b) obtaining, based on an entity property of the starting entity, a first rule for determining at least one related entity; and
 (c) determining, using the first rule, the at least one related entity relative to the starting entity.

Preferably, but not necessarily, the method comprises:
 (d) setting the at least one related entity as the starting entity; and
 (e) repeating steps (b) and (c), followed by step (d) until an end condition is satisfied.

Also preferably, but not necessarily, prior to step (d), the method comprises recording the starting entity to form at least part of the group of related entities. In other forms, the method comprises recording the at least one related entity to form at least part of the group of related entities.

In a particular, but non-limiting, form, obtaining the first rule comprises selecting the first rule from a set of first rules.

Additionally or alternatively, obtaining the first rule comprises transferring to a server processing system the entity property of the starting entity, and receiving, from the server processing system, the first rule.

In another particular, but non-limiting, form, the method comprises selecting, from a set of first rules and based on the entity property of the starting entity, a plurality of first rules.

The method can optionally comprise determining, using the plurality of first rules, the at least one related entity relative to the starting entity.

In accordance with a specific optional embodiment, the step of identifying the starting entity in the one or more processing systems comprises identifying, using a second rule, the starting entity in the one or more processing systems.

Alternatively, the step of identifying the starting entity in the one or more processing systems comprises selecting the starting entity in the one or more processing systems.

In one form, the first rule is configured to determine suspicious related entities relative to the starting entity.

Optionally, the method comprises identifying if at least some of the group of related entities is malicious.

According to one embodiment, the method comprises:
  (i) determining, using a third set of rules, a level of maliciousness for at least some of the suspicious related entities; and
  (ii) if the level of maliciousness satisfies a criteria, identifying the at least some of the suspicious related entities as malicious.

According to another non-limiting embodiment, in response to at least some of the group being identified as malicious, the method comprises recording the at least some of the group identified as being malicious in a database.

According to a further non-limiting embodiment, the method comprises:
  (i) identifying common suspicious entities between a plurality of records of suspicious related entities; and
  (ii) determining, using a third set of rules and the common suspicious entities, one or more malicious entities.

In accordance with another non-limiting embodiment, in response to at least some of the group being identified as malicious, the method comprises quarantining the at least some of the group.

In one non-limiting form, quarantining the at least some of the group comprises removing or modifying the at least some of the group in the one or more processing systems.

Preferably, but not necessarily, the method comprises using a white-list to divide the group of suspicious related entities into one or more sub-groups.

Also preferably, but not necessarily, the method comprises:
  (i) transferring, to a server processing system, data indicative of the one or more suspicious related entities; and
  (ii) receiving, from the server processing system, data indicative of whether at least some of the group is malicious.

In particular, but non-limiting, forms, the data is further indicative of at least one of:
  (i) an identity of the at least some of the group that has been identified as being malicious; and
  (ii) one or more instructions for quarantining the at least some of the group.

In another particular, but non-limiting, form, the one or more instructions for quarantining the at least some of the group are computer executable instructions, wherein the method comprises executing the computer executable instructions in at least one of the one or more processing systems to thereby quarantine the at least some of the group.

In accordance with a specific optional embodiment, the end condition is at least one of:
  (i) when no related entities are determined in a particular repetition;
  (ii) when no new related entities are determined in a particular repetition;
  (ii) when no related entities are determined in a period of time;
  (iii) when the starting entity has an entity property which is indicative of the end condition; and
  (iv) when a selected number of repetitions have been performed.

According to another non-limiting embodiment, at least one of the first rule, the second rule and the third rule are weighted.

In particular, but non-limiting, forms, the method comprises:
  (i) receiving an updated first rule, an updated second rule and/or an updated third rule; and
  (ii) updating the first rule, the second rule and/or the third rule with the updated rules.

In another particular, but non-limiting, form, the method comprises at least one of:
  (i) reporting the group of related entities to a user of the processing system; and
  (ii) reporting the group of related entities to a server processing system.

In accordance with a specific optional embodiment, the first rule, second rule or the third rule comprise using at least one of:
  (i) statistical processes;
  (ii) fuzzy logic processes; and
  (iii) heuristical processes.

In a second broad form, the present invention provides a system to determine a group of related entities of interest in one or more processing systems, wherein the system comprises the one or more processing systems configured to:
  (a) identify a starting entity from one or more entities in the one or more processing systems;
  (b) obtain, based on an entity property of the starting entity, a first rule for determining at least one related entity; and
  (c) determining, using the first rule, the at least one related entity relative to the starting entity.

In a third form the present invention provides a method of determining one or more malicious entities within one or more processing systems, wherein the method comprises the steps of:
  (i) receiving suspicious entity data indicative of one or more suspicious related entities in the one or more processing systems;
  (ii) determining, using a set of malicious assessment rules and the suspicious entity data, one or more malicious entities.

In a fourth form the present invention provides a system for determining one or more malicious entities within one or more processing systems, wherein the system comprises one or more processing systems configured to:
  (i) receive suspicious entity data indicative of one or more suspicious entities in the one or more processing systems;
  (ii) determine, using a set of malicious assessment rules and the suspicious entity data, one or more malicious entities.

In a fifth broad form, the present invention provides a method of determining one or more malicious entities within one or more processing systems, wherein the method comprises the steps of:
  (i) receiving multiple records of suspicious entity data indicative of groups of suspicious entities in the one or more processing systems;

(ii) determining common suspicious entities between records of the suspicious entity data; and (iii) determining, using a set of malicious assessment rules and the common suspicious entities, one or more malicious entities.

Preferably, but not necessarily, the method comprises storing the one or more malicious entities in a database.

Optionally, the malicious assessment rules are weighted according to a set of priorities.

In another particular, but non-limiting, form, the method comprises:

(i) generating instructions for quarantining the at least some of the group; and (ii) transferring, to the one or more processing systems, the instructions.

In accordance with a specific optional embodiment, the method comprises transferring to the one or more processing systems instructions which are computer executable instructions.

In a sixth broad form, the present invention provides a system for determining one or more malicious entities within one or more processing systems, wherein the system comprises:

(a) a means to receive multiple records of suspicious entity data indicative of groups of suspicious entities in the one or more processing systems;

(b) a means to determine suspicious entities in common between two or more records of the suspicious entity data; and (c) a means to determine, using a set of malicious assessment rules and the common suspicious entities, one or more malicious entities.

In a seventh broad form, the present invention provides a method of determining a group of one or more related entities of interest, being related to a starting entity, in a processing system, wherein the method comprises:

(i) identifying a starting entity in the processing system;

(ii) determining, using a first set of rules, other entities in the processing system which are directly or indirectly related to the starting entity; and, (iii) grouping the entities into clusters using a second set of rules, wherein each cluster is indicative of a group of related entities.

In an eighth broad form the present invention provides a method of determining a group of one or more related entities of interest in a processing system, wherein the method comprises:

(a) identifying a starting entity in the processing system;

(b) determining an entity property of the starting entity;

(c) selecting, from a first set of rules and in accordance with the entity type, a subset of rules;

(d) determining the group of related entities using the subset of rules;

(e) determining if any of the related entities are a common related entity, being related to a secondary entity not being the starting entity or one of the group of related entities.

In a ninth broad form, the present invention provides a method of recording one or more malicious entities within one or more processing systems, wherein the method comprises the steps of:

determining, using data indicative of one or more suspicious entities, one or more malicious entities; and recording the one or more malicious entities.

In a tenth broad form, the present invention provides a system of recording one or more malicious entities within one or more processing systems, wherein the system comprises:

a means to determine, using data indicative of one or more suspicious entities, one or more malicious entities; and a means to record the one or more malicious entities.

BRIEF DESCRIPTION OF FIGURES

An example embodiment of the present invention should become apparent from the following description, which is given by way of example only, of a preferred but non-limiting embodiment, described in connection with the accompanying figures.

MODES FOR CARRYING OUT THE INVENTION

The following modes, given by way of example only, are described in order to provide a more precise understanding of the subject matter of a preferred embodiment or embodiments.

Figure 1:
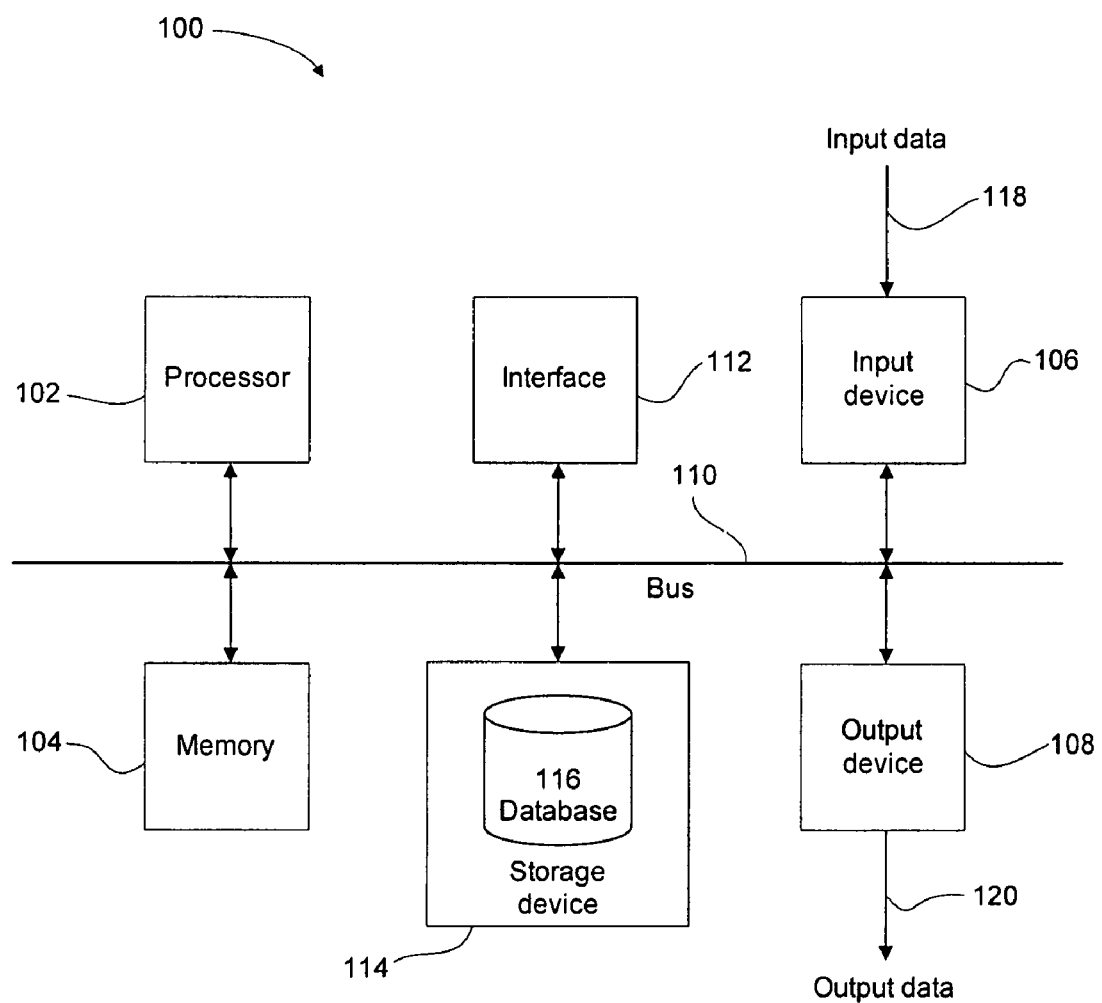
FIG. 1 illustrates a functional block diagram of an example of a processing system that can be utilised to embody or give effect to a particular embodiment.

A particular embodiment of the present invention can be realised using a processing system, an example of which is shown in FIG. 1. In particular, the processing system 100 generally comprises at least one processor 102, or processing unit or plurality of processors, memory 104, at least one input device 106 and at least one output device 108, coupled together via a bus or group of buses 110. In certain embodiments, input device 106 and output device 108 could be the same device. An interface 112 can also be provided for coupling the processing system 100 to one or more peripheral devices, for example interface 112 could be a PCI card or PC card. At least one storage device 114 which houses at least one database 116 can also be provided. The memory 104 can be any form of memory device, for example, volatile or non-volatile memory, solid state storage devices, magnetic devices, etc. The processor 102 could comprise more than one distinct processing device, for example to handle different functions within the processing system 100. Input device 106 receives input data 118 and can comprise, for example, a keyboard, a pointer device such as a pen-like device or a mouse, audio receiving device for voice controlled activation such as a microphone, data receiver or antenna such as a modem or wireless data adaptor, data acquisition card, etc. Input data 118 could come from different sources, for example keyboard instructions in conjunction with data received via a network. Output device 108 produces or generates output data 120 and can comprise, for example, a display device or monitor in which case output data 120 is visual, a printer in which case output data 120 is printed, a port for example a USB port, a peripheral component adaptor, a data transmitter or antenna such as a modem or wireless network adaptor, etc. Output data 120 could be distinct and derived from different output devices, for example a visual display on a monitor in conjunction with data transmitted to a network. A user could view data output, or an interpretation of the data output, on, for example, a monitor or using a printer. The storage device 114 can be any form of data or information storage means, for example, volatile or non-volatile memory, solid state storage devices, magnetic devices, etc.

In use, the processing system 100 is adapted to allow data or information to be stored in and/or retrieved from, via wired or wireless communication means, the at least one database 116. The interface 112 may allow wired and/or wireless communication between the processing unit 102 and peripheral components that may serve a specialised purpose. The processor 102 receives instructions as input data 118 via input device 106 and can display processed results or other output to a user by utilising output device 108. More than one input device 106 and/or output device 108 can be provided. It should be appreciated that the processing system 100 may be any form of terminal, server, specialised hardware, or the like.

The processing system 100 may be a part of a networked communications system. Processing system 100 could connect to network, for example the Internet or a WAN. Input data 118 and output data 120 could be communicated to other devices via the network. The transfer of information and/or data over the network can be achieved using wired communications means or wireless communications means. A server can facilitate the transfer of data between the network and one or more databases. A server and one or more databases provide an example of an information source.

Figure 2:
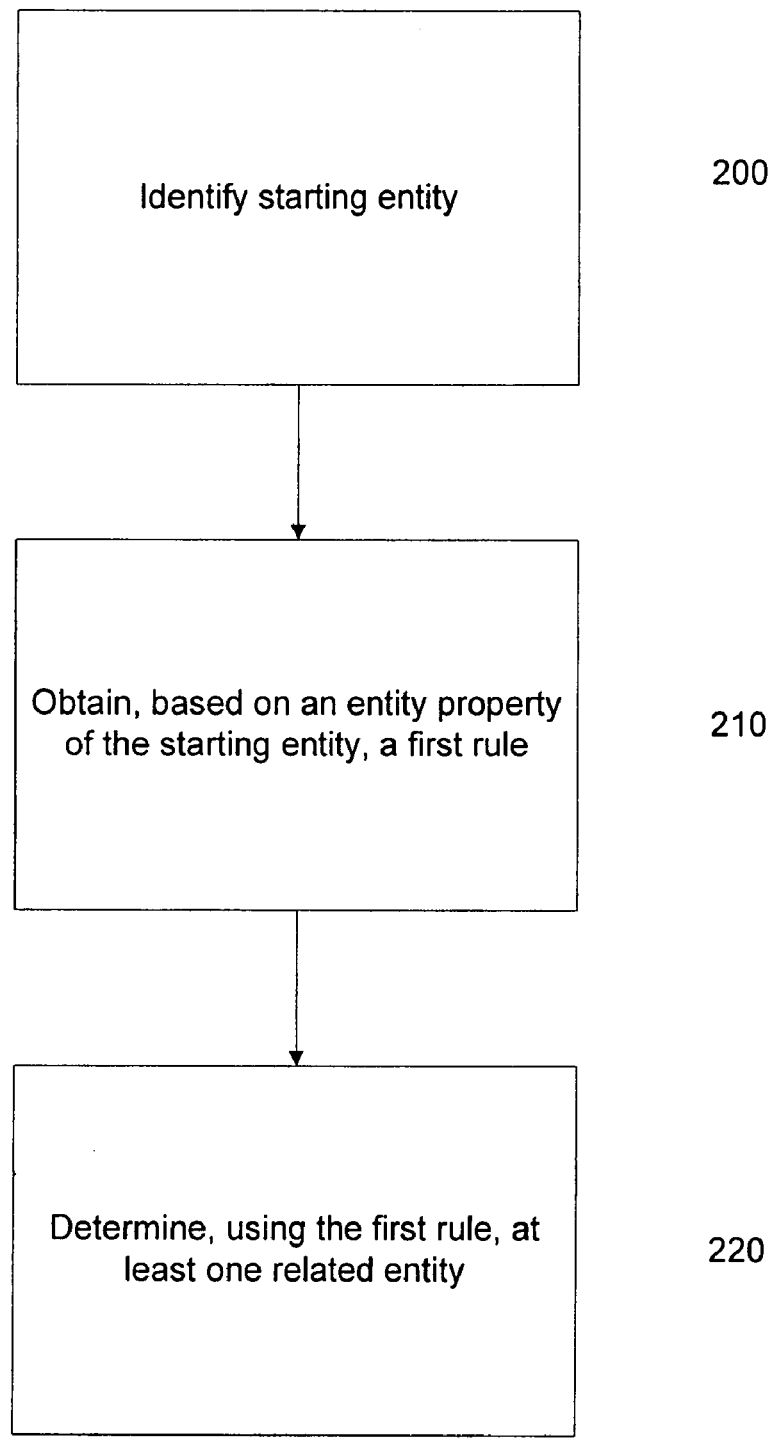
FIG. 2 illustrates a flow diagram of an example method of determining a group of related entities of interest.

Referring now to FIG. 2, there is illustrated a flow chart showing an example method of determining a group of related entities of interest in one or more processing systems.

In particular, at step 200 the method comprises identifying a starting entity from one or more entities in the one or more processing systems. At step 210, the method comprises obtaining, based on an entity property of the starting entity, a first rule (herein referred to as a related entity rule) for determining at least one related entity. At step 220, the method comprises determining, using the related entity rule, the at least one related entity relative to the starting entity.

By obtaining the related entity rule or rules using the entity property of the starting entity, the at least one related entity can be determined accurately and quickly. Furthermore, this method can be operated without having an indepth knowledge of the structure of the processing system. Additionally, by using the entity property of the starting entity to obtain the related entity rule, the method is optimised to use relevant rules for the particular starting entity, as will be discussed in more detail herein.

Figure 3A:
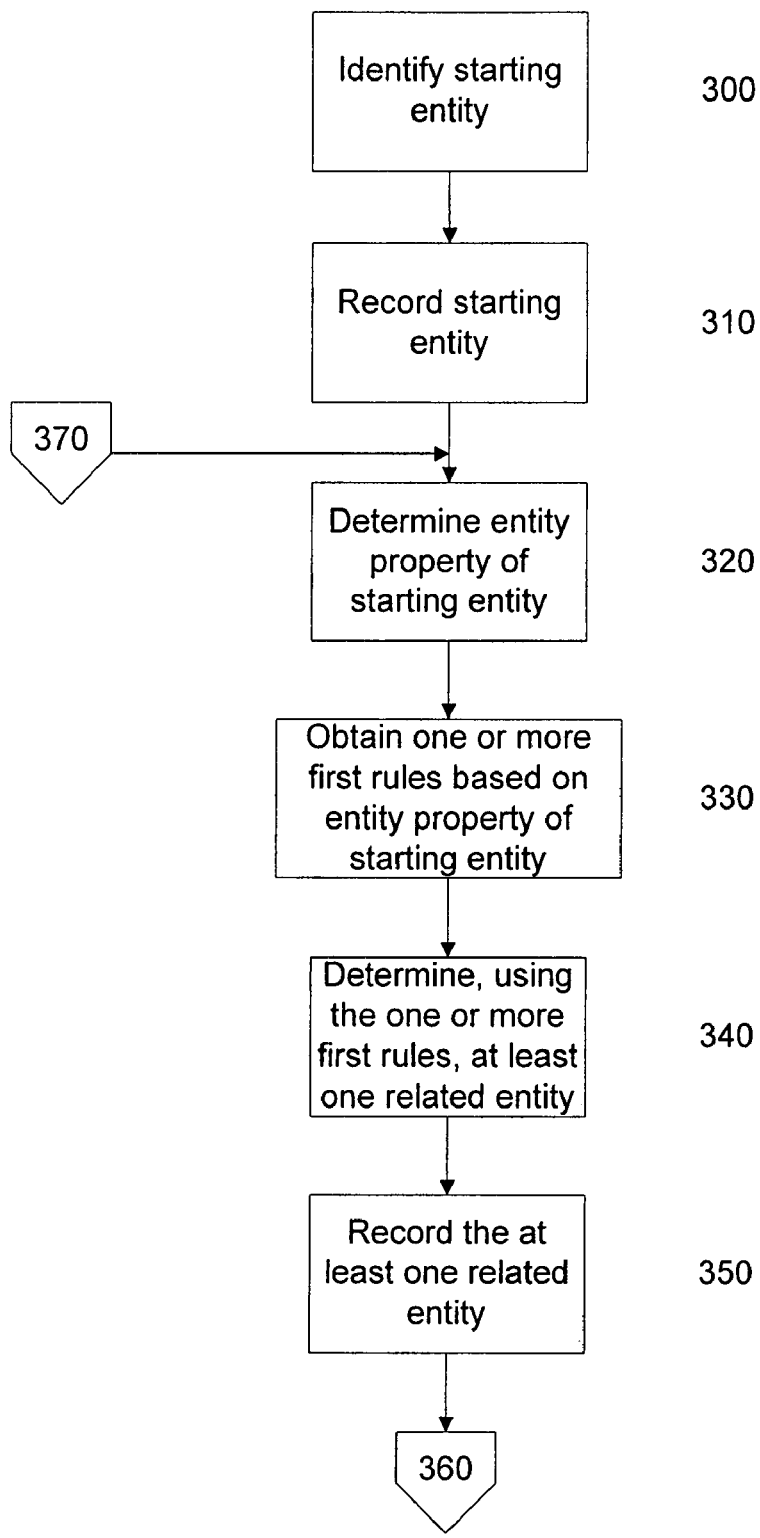
FIGS. 3A and 3B illustrate a further example of the method illustrated in FIG. 2 which is directed towards determining a group of entities which are suspicious.
Figure 3B:
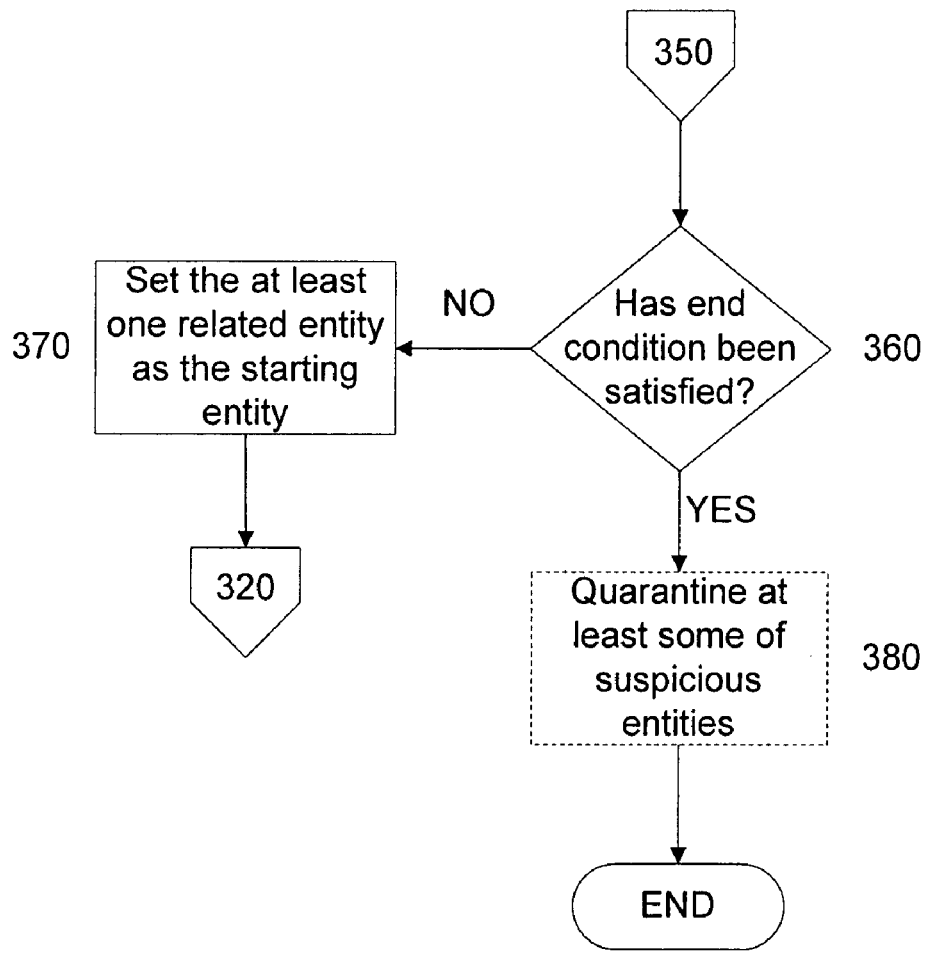

A more detailed example of a method illustrated in FIG. 2 will now be described with reference to FIGS. 3A and 3B, which are directed towards determining a group of related entities which are at least, in part, suspicious. However, it will be appreciated that this example could similarly be applied to other areas for determining related entities in a processing system.

In particular, at step 300, the method comprises identifying a starting entity. This may comprise identifying, using one or more second rules (herein referred to as the starting entity rules), the starting entity in the one or more processing systems.

Examples of the starting entity rules may comprise:

if a particular entity was created or modified within the one or more processing systems within a selected period of time, then the particular entity is determined as being the starting entity;

if a particular entity creates or modifies an entity within one or more processing systems within a selected period of time, then the particular entity is determined as being the starting entity;

if a particular entity was activated within the one or more processing systems within a selected period of time, then the particular entity is determined as being the starting entity;

if a particular entity was downloaded from one or more network addresses, a network address range and/or network address name within the one or more processing systems, then the particular entity is determined as being the starting entity;

if a particular entity was triggered in an automatic manner by a trigger mechanism in the processing systems such as a runkey within the one or more processing systems, then the particular entity is determined as being the starting entity;

a particular entity was created by another process within the one or more processing systems, then the particular entity is determined as being the starting entity;

if a particular entity was downloaded by a process with a file size in a certain range, then the particular entity is determined as being the starting entity;

if a particular entity was downloaded by a process which has a suspicious pattern of download activity, then the particular entity is determined as being the starting entity;

if a particular entity creates a process, run key, executable, windows instance, cookie, BHO, TOOLBAR, module, link, and or favourite link, then the particular entity is determined as being the starting entity;

if a particular entity creates a process, run key, executable, windows instance, cookie, BHO, TOOLBAR, module, link, favourite link, then the particular entity is determined as being the starting entity;

if a particular entity creates a number of windows instances in quick succession, then the particular entity is determined as being the starting entity;

if a particular entity attempts to hide itself, then the particular entity is determined as being the starting entity;

if a particular entity attempts to create a number of copies of itself, then the particular entity is determined as being the starting entity;

if a particular entity attempts to create random named or sized entities, then the particular entity is determined as being the starting entity;

if a particular entity attempts to create random and fixed section entities, then the particular entity is determined as being the starting entity;

if a particular entity is polymorphic, then the particular entity is determined as being the starting entity;

if a particular entity accesses a processing system network, such as the Internet/tcpip, for the first time on this processing system, then the particular entity is determined as being the starting entity;

if a particular entity downloads executables, then the particular entity is determined as being the starting entity;

if a particular entity sends email, IRC or any messages using TCP/IP, then the particular entity is determined as being the starting entity;

if a particular entity matches an entity in a database comprising records of malicious entities, then the particular entity is determined as being the starting entity;

if the particular entity contains instructions, functions and/or dynamic linked libraries that contain instructions and or functions that are characteristic of malware, then the particular entity is determined as being the starting entity;

if a particular entity contains strings that correspond to executable filenames, trigger entity names, network address or network address range or network address name, class identities or GUIDS, then the particular entity is determined as being the starting entity;

if a particular entity has no vendor name, then the particular entity is determined as being the starting entity, then the particular entity is determined as being the starting entity;

if a particular entity has an embedded script or executable, then the particular entity is determined as being the starting entity;

if a particular entity is a class identity, shortcut link on a desktop of a processing system, trigger entity, network address or network address range or network address name, BHO or toolbar, executable, module, favourite, cookies, INF file, archive, then the particular entity is determined as being the starting entity;

if a particular entity is in a section of the processing system where malicious entities tend to exist, then the particular entity is determined as being the starting entity;

if a particular entity has an internal file signature which varies from the extension type of the particular entity, then the particular entity is determined as being the starting entity;

if a particular entity has a file size which is indicative that it may be a malicious entity, then the particular entity is determined as being the starting entity;

if a particular entity comprises a hidden entity property, the particular entity is determined as being the starting entity;

if a particular entity has a name which fails to appear in a white-list, the particular entity is determined as being the starting entity;

if a particular entity has a particular MD5 hash value which fails to appear in a white-list, the particular entity is determined as being the starting entity;

if a particular entity has a name which comprises Unicode, the particular entity is determined as the starting entity;

if a particular entity has a name which comprises a selected keyword, the particular entity is determined as the starting entity;

if a particular entity is located is a selected location in the processing system, the particular entity is determined as the starting entity;

if a particular entity performs an event which creates an executable file on disk, the particular entity is determined as the starting entity; and if a particular entity performs an event which comprises accessing a processing network on one or more given ports, the particular entity is determined as the starting entity.

Optionally, two or more starting rules may be combined using logical operators (i.e. AND/OR/NOT etc) to generate one or more meta starting entity rules used to determine the starting entity.

A number of the starting entity rules can be used in combination with a history record indicative of a trend of activity in the processing system in order to determine a starting entity which is suspicious. For example, the processing system may be configured to record when a user operates the processing system. The processing system can record the average period which the processing system is operated. One of the above starting entity rules may be configured to detect whether any entities have been created or modified between particular periods of time. The history list can then be used in combination to determine the average time periods which the user would not typically operate their processing system to determine a suspicious starting entity in the processing system.

From the above example, it will be apparent that starting entity rules may be dynamically generated using input from input sources such as the history record. This allows for particular trends in the use of the processing system to be taken into account when the starting entity rules are applied and also reduces the detection of false positives.

The starting entity rules may be user defined. In some forms, the starting entity rules apply statistical, fuzzy logic and/or heuristical processes. Figures associated with these processes may be altered by the user to configure a more accurate detection of suspicious starting entities in the one or more processing systems.

An event record indicative of past events that occurred in the processing system can also be used by the starting entity rules to determine the starting entity. For example, the event record may indicate that an entity named "SPAMMER.exe" was created at 2 am in the processing system. Using a selected period of time which suspicious entities would be modified or created, the event list in combination with one or more starting entity rules can result in the detection of "SPAMMER.exe" as a suspicious entity and thus a starting entity. The event record can be created using API interception for particular events of interest which occur in the one or more processing systems. These particular events may be user defined or may be preconfigured.

The starting entity rules may be automatically applied in the background of the processing system without the user initiating the task, or the user may initiate the task to identify the starting entity in the one or more processing systems. When a positive determination occurs for one or more starting entity rules, the entity is identified as the starting entity.

For example, a processing system may comprise the following entities:

TABLE 1

Example of entities in a processing system

| Entity Name | Time entity was created/last modified | Hidden Property |
|---|---|---|
| Explorer.exe | 1/2/2005 | No |
| Spywarz.exe | 1/2/2006 12:03 | Yes |
| Word.exe | 1/3/2005 | No |

The starting entity rules in this particular example may comprise the following:

1. If a particular entity was created or modified after Jan. 31, 2006, the particular entity is determined as the starting entity; and
2. If a particular entity has a hidden property, the particular entity is determined as the starting entity.

When the starting entity rules are used in relation to the entities from Table 1, it is apparent that "Spywarz.exe" is determined as being the starting entity, and that Explorer.exe and Word.exe are not considered starting entities. In this particular case, a majority of the starting entity rules have been satisfied that "Spywarz.dll" is the starting entity in the processing system. Therefore, "Spywarz.exe" is identified as the starting entity.

In an alternate example, if a particular entity satisfies one starting entity rule, an arbitrary number of starting entity rules, or a selected number of starting entity rules, the particular entity is identified as a starting entity.

Other factors may additionally or alternatively be used to determine whether a particular entity in the processing system is the starting entity. One or more starting entity rules may be weighted according to one or more priorities. For example, the first starting entity rule above may be given a weighting of 0.6, whereas the second starting entity rule above may be given a weighting of 0.4. Therefore, the weighting of each satisfied starting entity rule may be summed or used in a calculation, and if the result satisfies a particular criteria, the particular entity is identified as the starting entity.

The step of identifying the starting entity may alternatively comprise the user selecting the starting entity in the one or more processing systems. For example, a user may manually select a starting entity in one of the processing systems using an input device such as a mouse and/or keyboard. This may occur when the user wishes to determine the related entities for a particular starting entity in the processing system.

At step 310, the method comprises recording the starting entity. This generally comprises the processing system recording the starting entity in the processing system memory, such as a data store. The starting entity may be stored in the form of a table or list. In one form, the related entities for the starting entity can be stored in a linked list, wherein the starting entity is the head of the list and the related entities are nodes directly or indirectly related to the starting entity.

At step 320, the method comprises determining an entity property associated with the starting entity. The entity property may be an entity type of the entity, such as whether the starting entity is an executable entity, a run key entity or a dynamic linked library entity. The entity property may also be a time that the entity was created or modified. The entity property may comprise the directory which the entity is contained within. The entity property may also be a vendor name associated with the entity. The entity property may also be a particular network address from which the entity was downloaded.

It will be appreciated that more than one entity properties may be determined for the starting entity. However, for the purposes of simplicity, throughout this example it will be assumed that one entity property has been determined for the starting entity.

At step 330, the method comprises obtaining, based on the entity property of the starting property, one or more related entity rules. In this particular example, the one or more related entity rules take the form of one or more rules for determining suspicious entities related to the starting entity. Step 330 may comprise selecting, based on the entity property, the one or more related entity rules from a larger set of related entity rules. Each related entity rule is associated with a particular entity property, and as such, a selection of a related entity rules can be performed based on the entity property of the starting entity. The selection of related entity rules from a larger list allows for a dynamic application of rules, significantly increasing efficiency due to the applicable subset of rules from the larger set of rules being applied to identify the related entities relative to the starting entity.

An example list of entity properties and corresponding related entity rules is shown below in List 2.

(i) if the starting entity comprises a vendor name, the at least one suspicious related entity is one or more entities comprising the same vendor name;

(ii) if the starting entity comprises a product name, the at least one suspicious related entity is one or more entities comprising the same product name;

(iii) if the starting entity comprises a version name, the at least one suspicious related entity is one or more entities comprising the same version name;

(iv) if the starting entity was created at a particular time in the one or more processing systems, the at least one suspicious related entity is one or more entities which were created at a similar time to that of the starting entity;

(v) if the starting entity accesses a particular network address or network address range or network address names, the at least one suspicious related entity is one or more entities which also access the same particular network address or network address range or network address names.

(vi) if the starting entity accesses a particular network address or network address range, the at least one suspicious related entity is the particular network address or network address range or network address names.

(vii) if the starting entity causes another process to execute, the at least one suspicious related entity is one or more entities which were executed by it.

(viii) if the starting entity was executed by a process, the at least one suspicious related entity is one or more entities which executed the starting entity.

(ix) if the starting entity creates or modifies an entity, the at least one suspicious related entity is one or more entities which it creates or modifies.

(x) if the starting entity is found in a directory not in a list of whitelist directories, the at least one suspicious related entity is one or more entities which also exist in the same directory.

(xi) if the starting entity is downloaded from the internet/tcpip, the at least one suspicious related entity is one or more entities which were downloaded at the same time or by the same process or from the same particular network address or network address range or network address names.

List 2: Example of Entity Properties and Corresponding Related Entity Rules

It will be appreciated that a more detailed list of entity properties and corresponding related entity rules can be obtained using the above general rules. An example of a more detailed list of entity properties and corresponding related entity rules are provided below.

TABLE 2

Further example of Entity Properties and corresponding related entity rules

| Entity Property | Related Entity Rule |
| --- | --- |
| trigger entity | The one or more suspicious related entities are triggerable etities which are triggerable by the run-key entity |
| executable entity | The one or more suspicious related entities are one or more files in an INF file associated with the starting entity |
| executable entity | The one or more suspicious related entities are one or more trigger entities which trigger the starting entity |

TABLE 2-continued

Further example of Entity Properties and corresponding related entity rules

| Entity Property | Related Entity Rule |
| --- | --- |
| executable entity | The one or more suspicious related entities are one or more favourites which trigger the starting entity |
| executable entity | The one or more suspicious related entities are one or more items of embedded executable content inside the starting entity |
| executable entity | The one or more suspicious related entities are one or more instances of windows created by the executable entity |
| executable entity | The one or more suspicious related entities are one or more desktop link files (short cuts) which trigger the executable entity |
| executable entity | The one or more suspicious related entities are one or more modules loaded by the starting entity |
| executable entity | The one or more suspicious related entities are one or more classids or guids assocaiated with the starting entity |
| executable entity | The one or more suspicious related entities are one or more network addresses or network address ranges or network address names associated with the starting entity |
| classid/guid entity | The one or more suspicious related entities are one or more BHO or TOOLBAR names associated with the classid/guid |
| classid/guid entity | The one or more suspicious related entities are one or more one or more class names associated with the classid/guid |
| classid/guid entity | The one or more suspicious related entities are one or more network addresses or network address ranges or network address names associated with the starting entity |
| classid/guid entity | The one or more suspicious related entities are one or more executable entities related to the classid/guid |
| module entity | The one or more suspicious related entities are one or more executable entities that are loaded by the module entity |
| network address/network address range/network address name | The one or more suspicious related entities are one or more files associated with the network address or network address range or network address name |
| network address/network address range/network address name | The one or more suspicious related entities are one or more links or short cuts associated with the network address or network address range or network address name |
| network address/network address range/network address name | The one or more suspicious related entities are one or more classids associated with the starting entity |
| network address/network address range/network address name | The one or more suspicious related entities are one or more favourites associated to the starting entity |
| network address/network address range/network address name | The one or more suspicious related entities are one or more executable entities related to the starting entity |
| network address/network address range/network address name | The one or more suspicious related entities are one or more start pages related to the starting entity |
| network address/network address range/network address name | The one or more suspicious related entities are one or more cookies related to the starting entity |
| BHO Tool Bar entity | The one or more suspicious related entities are one or more classids associated with the starting entity |
| BHO Tool Bar entity | The one or more suspicious related entities are one or more names associated with the starting entity |
| BHO Tool Bar entity | The one or more suspicious related entities are one or more executable entities executed by the starting entity |
| Favourites entity | The one or more suspicious related entities are one or more network addresses or network address ranges or network address names |
| Favourites entity | The one or more suspicious related entities are one or more executable entities executed by the starting entity |
| Links entity | The one or more suspicious related entities are one or more network addresses or network address ranges or network address names |
| Links entity | The one or more suspicious related entities are one ore more executable entities executed by the starting entity |
| Cookie entity | The one or more suspicious related entities are one or more network addresses or network address ranges or network address names associated with the starting entity |
| windows instance entity | The one or more suspicious related entities are one ore more executable entities that create the starting entity |
| Directory (not in a whitelist) entity | The one or more suspicious related entities are one or more entities that exist in that same directory. |
| INF entity | The one or more suspicious related entities are one or more entities referenced in the starting entity |
| Archive entity | The one or more suspicious related entities are one ore more entities within the archive entity |

TABLE 2-continued

Further example of Entity Properties and corresponding related entity rules

| Entity Property | Related Entity Rule |
|---|---|
| Archive entity | The one or more suspicious related entities are one or more entities in the same directory as the archive entity which fail to appear in a whitelist |
| vendor name of entity | The one or more suspicious related entities are one or more entities which share the same vendor name as the starting entity |
| product name entity | The one or more suspicious related entities are one or more entities which share the same product name as the starting entity |
| version name | The one or more suspicious related entities are one or more entities which share the same version name as the starting entity |
| Creation/Modification time of entity | The one or more suspicious related entities are one or more entities which a similar creation/modification time |

It will be appreciated that a starting entity having a trigger entity property could be any one of the following entities: run keys, Appinit, Uninstall Key, Service, Hooks, protocol filter, and a startup list. It will further be appreciated that a starting entity having an executable entity property could be any one of the following entities: executables, dynamic linked libraries, and other modules.

It will be appreciated from List 2 that the general entity properties and related entity rules can be extended to specific entity types, such as the entity types shown in Table 2, for example INF entities, Cookies entity, windows instance entity and the like shown above. The more specific rules in Table 2 allow for a more specific selection of rules based on the more specific entity property, which can therefore result in accurately determining the relevant suspicious related entity rules.

It will be appreciated that the application of particular related entity rules may require the use of the event record.

It will also be appreciated from Table 2 that more than one related entity rule can be obtained based on the one or more entity properties of the starting entity. As shown above in Table 2, if the entity property indicates that the starting entity is an executable entity, then nine separate types of related entity rules can be applicable for determining the related entities relative to the starting entity.

Additionally or alternatively, the one or more processing systems may transfer, to a server processing system, the entity property of the starting entity, and receive, from the server processing system, the one or more related entity rules. In this step, the server processing system may select the one or more related entity rules using the entity property from a server set of related entity rules, and then transfer the one or more related entity rules to the one or more processing systems.

At step 340, the method comprises determining, using the one or more related entity rules, the at least one related entity. In this particular example the related entity rules determine suspicious related entities. For simplicity purposes, the following example is presented using one related entity rule, however, it will be appreciated that more than one related entity rule can be used. Using the example from Table 1, "Spywarz.exe" comprised a vendor name of "Spywarz Software Enterprises". Therefore, this entity property can be used to obtain a related entity rule such as:

"The one or more related entities have a vendor name equalling Spywarz Software Enterprises".

It will be appreciated from the above related entity rule, that rules can be dynamically generated based directly or indirectly on the value of the entity property of the starting entity. This related entity rule is then used to determine any entities in the one or more processing system which satisfy this rule. Once a scan of the one or more processing systems has been performed using the related entity rule, it is determined that "Spywarz.dll" also shares a vendor name of "Spywarz Software Enterprises". As the related entity rule has been satisfied, "Spywarz.dll" is considered a related entity to the starting entity "Spywarz.exe". As such, a group of suspicious related entities has been determined which comprises "Spywarz.exe" and "Spywarz.dll".

Optionally, weighted values may be associated with the related entity rules. Furthermore, some related entity rules may be provided in the form of fuzzy logic expressions to determine one or more related entities relative to the starting entity.

Steps 300 to 340 represent a single iteration to determine a group of suspicious related entities. However, if a more detailed group of related entities is required, it is possible to perform multiple iterations of steps 300 to 340, as will now be discussed.

At step 350, the at least one related entity is recorded. This may involve adding the at least one related entity to the list or the table which comprises the starting entity recorded at step 310. Furthermore, the list or table may comprise data indicative of the relationship between the at least one related entity and entities which have been previously recorded.

At step 360, the method comprises determining if an end condition has been met. For example, the end condition may be satisfied when no new related entities are determined; when no new related entities are determined in a period of time; when the current entity has an entity type which is indicative of the end condition; and/or when a selected number of repetitions have been performed. If the end condition has not been met, the method proceeds to step 370.

At step 370, the method comprises setting the at least one related entity as the starting entity. This may be performed in memory by reassigning the value of the starting entity. By setting the at least one related entity as the starting entity, steps 320 to 360 can be repeated until an end condition is met, as will be discussed in more detail below. After step 370, the method proceeds back to step 320 to perform the next iteration, therefore determining the related entities for the newly set starting entity. As such, a web or network of related entities is determined until the end condition is met.

Once the end condition is satisfied, the determination of the group of suspicious related entities has been completed. Optionally, the recordings can be presented to a user of the processing system. The group of related entities may be presented in a tabular form or may be presented in a graphical representation. Additionally, the group of related entities may presented indicating direct or indirect links between entities in the group. For example, "Spywarz.exe" and "Spywarz.dll" from the above example would have a direct link. However, if a subsequent related entity to "Spywarz.dll" was determined to have a system variable named "SPYWARZ_VARIABLE", then there would be an indirect link between "Spywarz.exe" and "SPYWARZ_VARIABLE".

Optionally at step 380, the method comprises quarantining at least some of the suspicious entities. Generally, as will be discussed in further detail, the suspicious entities which are identified as being malicious are quarantined. This may comprise removing these entities from the one or more processing systems. Additionally or alternatively, this may comprise modifying these entities in the one or more processing systems.

An example of determining the malicious entities will now be described with reference to FIG. 4.

In particular, at step 400, the method comprises determining using data indicative of one or more suspicious entities, one or more malicious entities. At step 420, the method comprises recording the one or more malicious entities.

Figure 4:
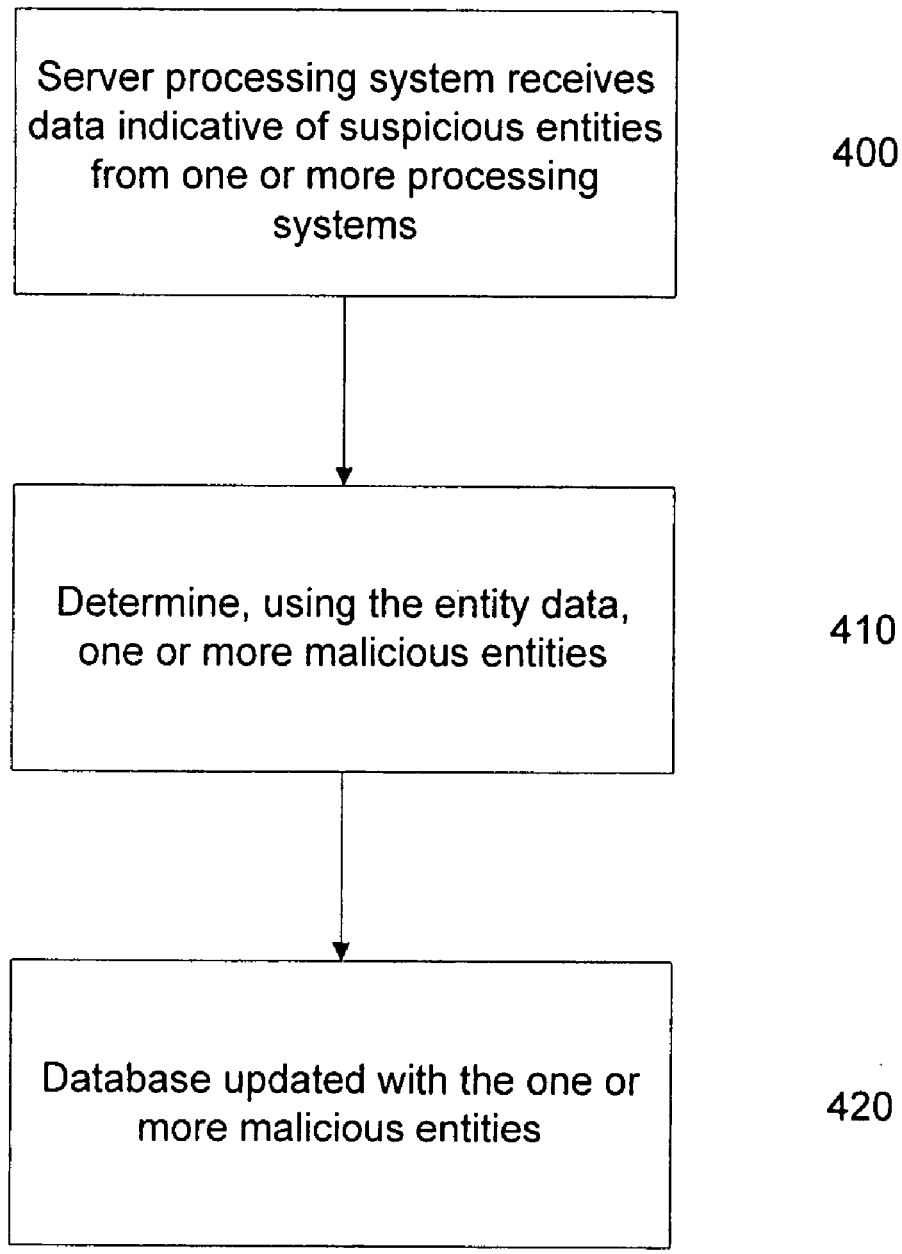
FIG. 4 illustrates a flow diagram of an example method of determining malicious entities.

It will be appreciated that the method of FIG. 4 can be performed by the one or more processing systems or a remote server processing system.

A more detailed example of a method of determining malicious entities will now be described with reference to FIG. 5.

Figure 5:
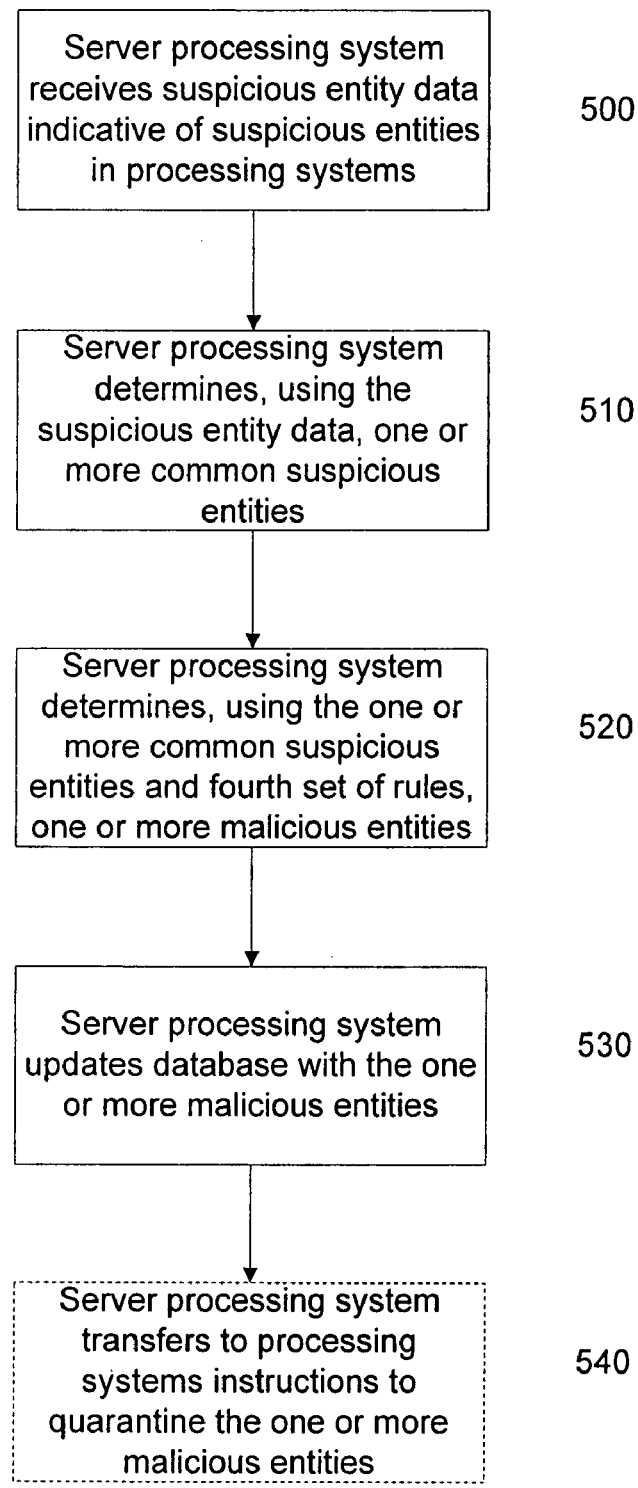
FIG. 5 illustrates a further example of the method illustrated in FIG. 4.

In particular, the method described with reference to FIG. 5 is in relation to a server processing system determining malicious entities based on suspicious entity data indicative of a group of suspicious related entities received from one or more processing systems. However, as previously stated, the method of determining malicious entities can equally be applied in the one or more processing systems.

At step 500 the method comprises receiving, in the server processing system, the suspicious related entity data from the one or more processing systems described above. The suspicious related entity data may comprise measurements and or properties associated with each suspicious related entity in the group. Additionally or alternatively, the suspicious related entity data may be the actual entities which are transferred from the one or more processing systems to the server processing system. The server processing system may also receive a suspicion identifier indicative of suspected behaviour associated with the suspicious entities. For example, the suspicious identifier may be indicative of the suspicious entities being associated with a pop-up window being displayed on the processing system at regular intervals. The suspicious related entity data may also comprise data indicating the starting entity in the group. The suspicious related entity data may also be indicative of one or more relationships (direct or indirect) between entities of the group, similar to that of a linked list.

At step 510, the server processing system determines, using the suspicious related entity data and other records of suspicious related entity data previously received, one or more common suspicious entities. This step comprises determining if the suspected entity data received from the processing system comprises one or more suspicious entities in common with other records of suspicious entity data received from other processing systems. If suspicion identifiers were received from the processing systems in relation to the suspicious entity data, the server may use the suspicion identifier to narrow the received suspicious entity data for determining common suspicious entities. By determining the common suspicious entities, the group of suspicious entities which may be malicious can be reduced and further significantly increases efficiency in determining the one or more malicious entities. Furthermore, this step provides a filter system of determining which suspicious entities are in common with different records of suspicious entities.

At step 520, the method comprises the server processing system determining, using the one or more common suspicious entities and a third set of rules (herein referred to as the malicious assessment rules), one or more malicious entities.

The malicious assessment rules can be a more complex set of rules compared to the related entities rules used by the processing systems to determine the suspicious related entities.

The malicious assessment rules can be used to determine a level of maliciousness for the common suspicious related entities. If the level of maliciousness is determined to satisfy a particular criteria, such as exceeding a maximum limit, then at least some of the common suspicious related entities are identified as malicious.

In one form, if a common suspicious entity satisfies a particular malicious assessment rule, the common suspicious entity is associated with a value or weight indicating how malicious the entity is considered. If the same common suspicious entity satisfies a number of particular malicious assessment rules, the values or weights associated with the entity are totalled. The total value or weight can be compared to a maximum limit to determine whether the common suspicious related entity is a malicious entity.

The malicious assessment rules are generally considered to be a stricter set of rules in order to filter the common suspicious related entities.

As the malicious assessment rules are generally more complex and considered more complete, a number of the suspicious entities may not satisfy the malicious assessment rules and are therefore not identified as malicious. For example, a legitimate print driver may have been identified as a common suspicious entity due to a particular malicious entity using the print driver to perform malicious activities on the one or more processing systems. However, after the malicious assessment rules are applied, the print driver is determined to not be malicious and is therefore not identified as being malicious. The remaining common suspicious entities which satisfy the malicious assessment rules are identified as being malicious to the one or more processing systems.

At step 530, the method comprises the server processing system recording in a database the one or more malicious entities identified in step 520. This process is particularly useful for early detection of new or modified malware, so that instructions can be generated as early as possible to quarantine the identified malicious entities in the processing systems.

Optionally, at step 540, the method comprises transferring from the server processing system instructions to quarantine the one or more processing systems. The instructions may be computer executable instructions which can be transferred from the server processing system to the one or more processing systems which can be executed to quarantine the one or more malicious entities. In one embodiment, quarantining the one or more malicious entities may comprise removing the one or more malicious entities from the one or more processing systems. In another embodiment, quarantining the one or more malicious entities may comprise modifying the one or more malicious entities in the one or more processing systems. The modification of malicious entities can be performed by injecting executable instructions in one or more of the malicious entities, in order to at least partially disable malicious activity.

Figure 6A:
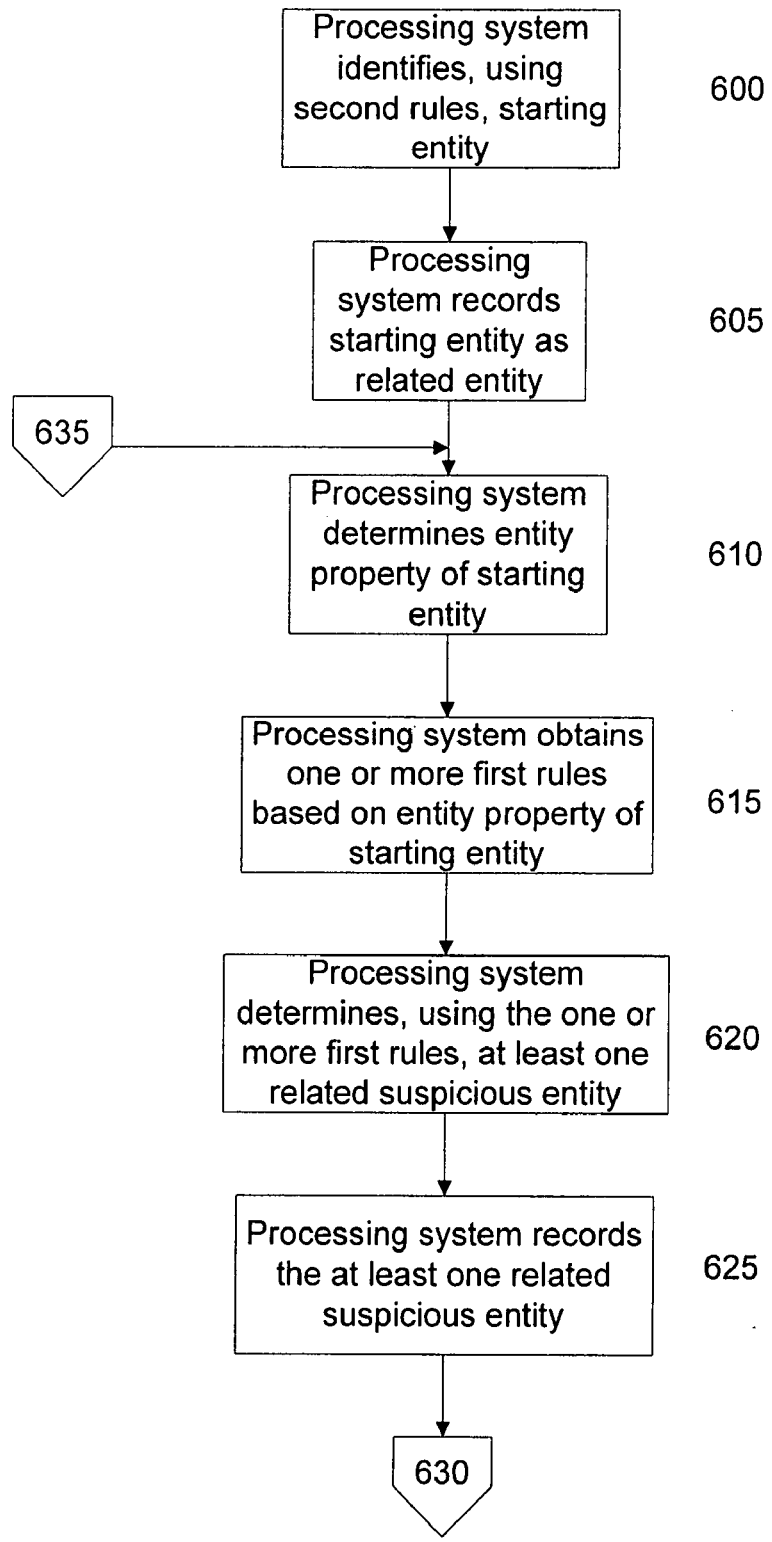
FIGS. 6A, 6B and 6C illustrate a further example of a method of determining suspicious entities and malicious entities.
Figure 6B:
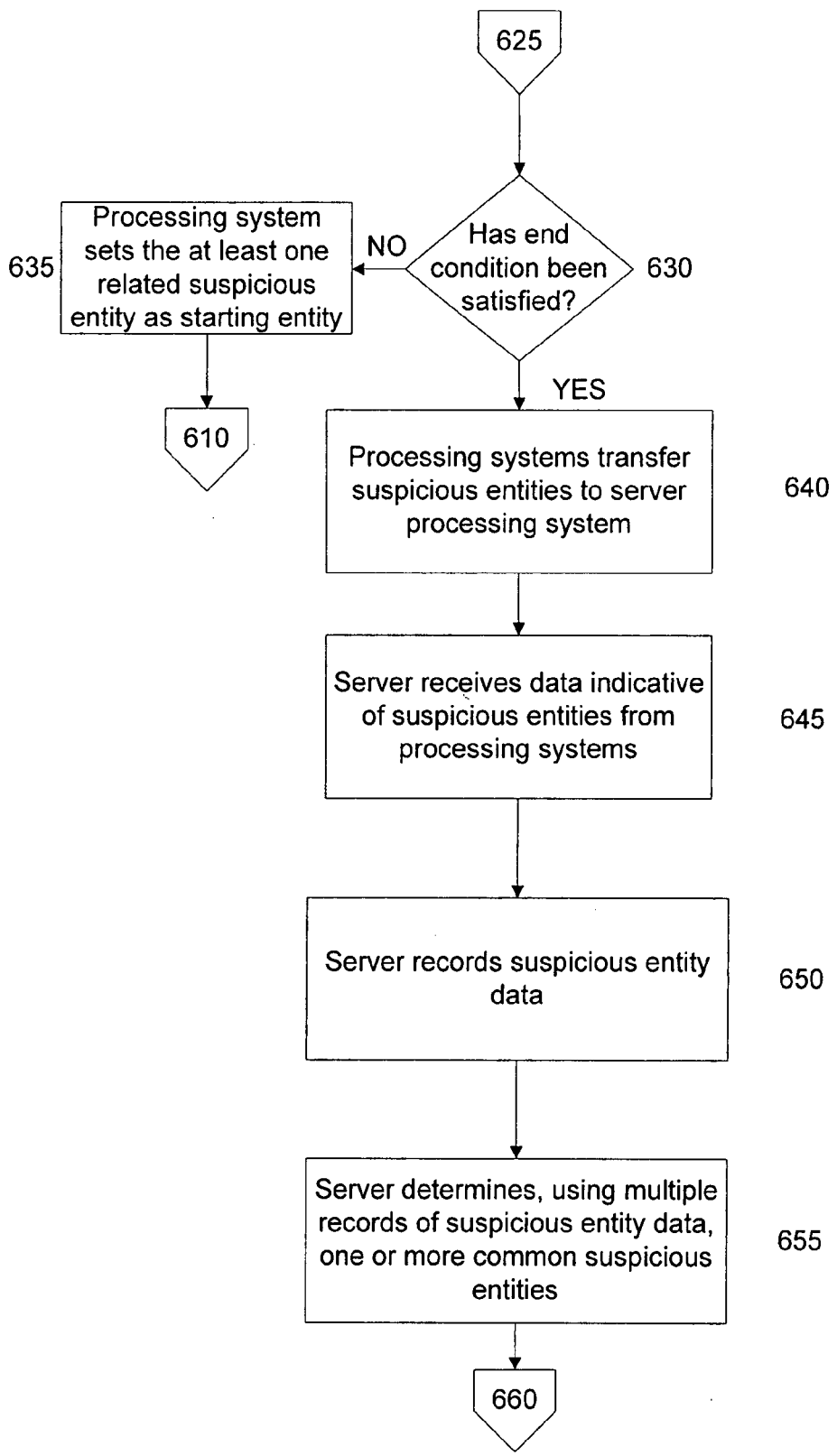
Figure 6C:
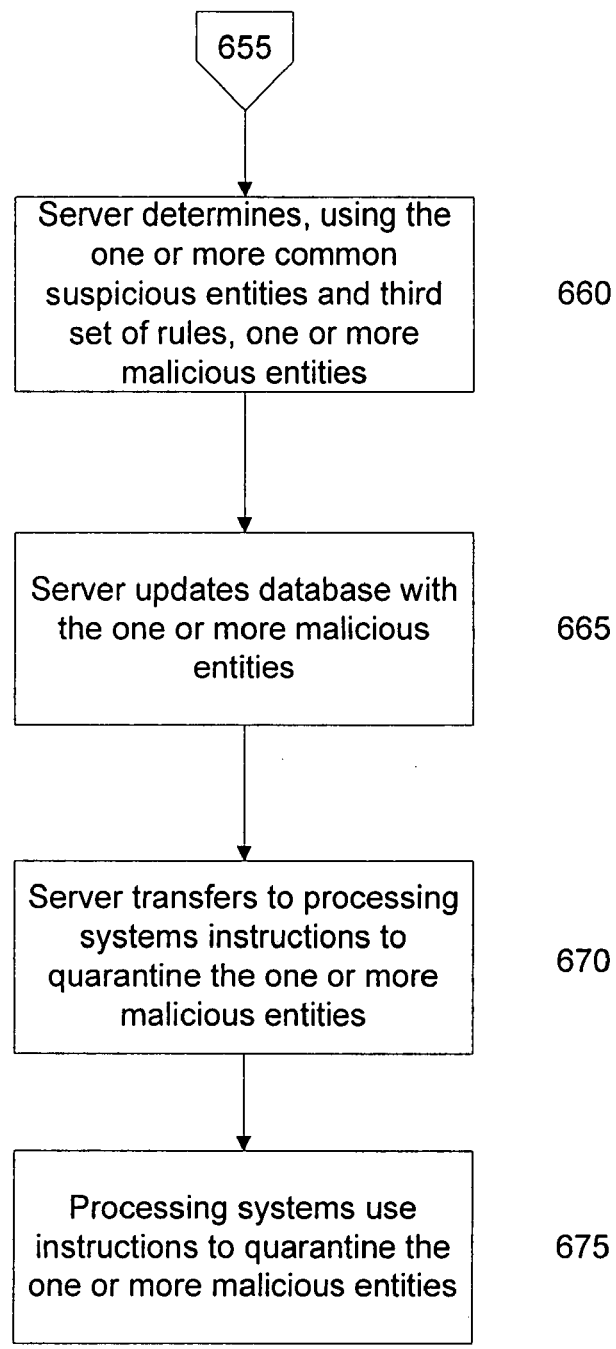

An example of a method of determining suspicious entities and malicious entities will now be described with reference to FIGS. 6A, 6B and 6C.

In particular, at step 600, a processing system identifies using the starting point rules (the second rules), one or more starting entities. At step 605, the processing system then records the starting entity as a related entity. At step 610, the processing system determines one or more entity properties of the starting entity. Then at step 615, the processing system obtains one or more related entity rules (first rules) based on the one or more entity properties of the starting entity. At step 620, the processing system determines, using the one or more related entity rules, the at least one or more suspicious entities.

At step 625, the method comprises the processing system recording the one or more suspicious related entities. Step 630 comprises the processing system determining whether an end condition has been satisfied. If the end condition has not been satisfied, then the processing system sets the one or more suspicious related entities as the starting entity at step 635, and then control returns back to step 610 of the method. If the end condition has been satisfied, then control continues to step 640.

At step 640, the processing system transfers the suspicious entity data indicative of the suspicious related entities to the server processing system. At step 645 the server receives the suspicious entity data indicative of the suspicious entities from the processing system. At step 650, the server records the suspicious entity data. At step 655, the server determines using multiple records of suspicious entity data, one or more common suspicious entities. At step 660, the server determines, using the one or more common suspicious entities and the malicious assessment rules (the third set of rules), one or more malicious entities.

At step 665, the server updates a database with the one or more malicious entities. At step 670, the server transfers to one or more processing systems instructions to quarantine the one or more malicious entities, or restrict the infection of the processing system with the one or more malicious entities. At step 675, one or more of the processing systems which received the instructions, use the instructions to quarantine the one or more malicious entities, or restrict the infection of the one or more processing systems with the one or more malicious entities.

Variations

Optionally, the one or more processing systems may receive, one or more updated related entity rules, one or more updated starting entity rules, and/or one or more updated suspicious assessment rules. The one or more processing systems may receive the updated rules from the server processing system or via a data store such as a compact disk or the like. The one or more processing systems can then update the existing rules with the updated rules.

In one form, statistical processes, fuzzy logic processes and/or heuristical processes can be used in combination with the related entity rules, the starting entity rules, and/or the malicious assessment rules to determine whether a rule has been satisfied. In some forms, a user of the processing system can modify one or more parameters of the above processes in order to configure the detection of related entities and provide a more highly accurate outcome.

In another variation, the system and method may utilise an event watch list which monitors if previously determined starting entities are triggered by an event. In response to a previously determined starting entity being triggered by an event, the method herein described is re-performed for this particular starting entity to determine any suspicious and malicious entities related to the starting entity.

Another particular application of the determination of the group of related entities is in the roll back of particular versions of software in a processing system. For example, a user may select an entity of a particular version of the software which they wished to be rolled back. This particular entity is identified as the starting entity and using the above method described, a group of related entities is determined. In some cases, the group of related entities may simply be able to be deleted to roll back the software to a prior version. However, for more complicated pieces of software, the group of related entities may be transferred to the software manufacturer where instructions are generated to roll back the software to a prior version.

This application with regard to versions of software may also extend to the Concurrent Versioning Systems. For example, a computer programmer may have checked-out a CVS repository for a particular piece of source code. The programmer modifies a number of functions in the source code. However, the programmer only wishes to contribute certain files to the CVS repository which are related to a specific function of the software. Traditionally, the user would need to remember particular files which are related to specific parts of the functionality to be submitted which can be extremely time consuming.

However using the above methodology, the user can identify a single modified/added file in the source code which is to be contributed, and this file will begin as the starting entity. This starting entity allows a group of related entities to be determined which are related to the specific functionality which is to be contributed to the CVS repository. Optionally, the entity data may then be transferred to the CVS server which may generate CVS instructions to allow the contribution of the group of related entities. The CVS instructions may then be executed by the user such that the new functionality has been contributed to the CVS repository.

In alternative embodiments, it will be appreciated that the third set of rules may be located and applied at the one or more processing systems in order to determine which entities are malicious, without using a server processing system to determine which suspicious entities are malicious entities.

The embodiments illustrated in FIGS. 2 to 6 may be implemented as a software package or component. Such software can then be used to pro-actively seek to determine a group of related entities of interest, such as malicious software. Various embodiments can be implemented for use with the Microsoft Windows operating system or any other modern operating system.

It will be appreciated that although in some of the above examples the server processing system generates the instructions to quarantine the malicious entities, the one or more processing systems may alternatively generate the instructions.

Other processes may be used, separately or in combination with the malicious assessment rules, to determine which part of the group is malicious. For example, the method may comprise using a white-list to divide the group into the one or more sub-groups. For example, a group of related entities may comprise operating system files, and non-operating system files. The method may therefore comprise, using a white-list to separate the group of related entities into a cluster of operating system files and a cluster of non-operating system files. Based on this separation, it may be determined that the non-operating system files are malicious.

Additionally or alternatively, different weighting values may be assigned to different malicious assessment rules. The weighting values of the satisfied malicious assessment rules may be summed or used in a calculation, and if the result is above a maximum limit, then at least some of the group is determined to be malicious.

It is noted that an entity which is suspicious is not always identified as being malicious (i.e. an entity which is identified as being suspicious is only suspected as being a malicious entity). However, an entity which is identified as being malicious is identified as being suspicious.

The related entity rules are generally less complex (such as a reduced number of rules) compared to the malicious assessment rules in order to reduce the processing performed by the processing systems. The malicious assessment rules can be used by a server system to determine which suspicious entities are malicious. By using this configuration, the server preferably performs the processing related to determining the malicious entities, and thus the client processing systems can utilise the processing system resources more effectively.

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although a preferred embodiment has been described in detail, it should be understood that various changes, substitutions, and alterations can be made by one of ordinary skill in the art without departing from the scope of the present invention.

The claims defining the invention are as follows:

1. A method of determining a group of related entities of interest in one or more processing systems, wherein the method comprises the steps of:
    (a) identifying, by a processing system, using a second rule, a starting entity from one or more entities in the one or more processing systems, wherein the second rule comprises an event record indicative of at least one past event that occurred in the processing systems;
    (b) obtaining, by the processing system, based on an entity property of the starting entity, a first rule for identifying at least one related entity;
    (c) identifying, by the processing system, using the first rule, the at least one related entity relative to the starting entity;
    (d) determining, by the processing system, if an end condition is satisfied;
    (e) if the end condition is satisfied, transferring data indicative of the at least one identified related entity to a server processing system;
    (f) if the end condition is not satisfied, setting the at least one related entity as the starting entity;
    (g) repeating steps (b), (c), (d), (e), and (f) until the end condition is satisfied;
    (h) receiving, by a server processing system, suspicious entity data indicative of one or more suspicious entities in the one or more processing systems;
    (i) determining, by the server processing system, a quantity of malicious assessment rules satisfied by the one or more suspicious entities;
    (j) assigning, by the server processing system, a malicious value to the one or more suspicious entities based on the quantity of malicious assessment rules satisfied by the one or more suspicious entities, wherein the malicious value indicates a potential maliciousness of the one or more suspicious entities;
    (k) determining, by the server processing system, using a set of malicious assessment rules, the suspicious entity data, and the assigned malicious values, the one or more malicious entities;
    (l) generating instructions for quarantining the one or more malicious entities on the one or more processing systems; and
    (m) transferring, to the one or more processing systems, the instructions.

2. The method according to claim 1, wherein the step of obtaining the first rule comprises selecting the first rule from a set of first rules according to the entity property.

3. The method according to claim 1, wherein the step of identifying the starting entity in the one or more processing systems comprises:
    a user selecting the starting entity in the one or more processing systems using an input device.

4. The method according to claim 3, wherein the first rule is configured to determine one or more suspicious related entities relative to the starting entity.

5. The method according to claim 4, wherein the method comprises:
    (i) determining, using a third set of rules, a level of maliciousness for at least some of the suspicious related entities; and
    (ii) if the level of maliciousness satisfies a criteria, identifying the at least some of the suspicious related entities as malicious.

6. The method according to claim 5, wherein the method comprises:
    (i) identifying common suspicious entities between a plurality of records of suspicious related entities; and
    (ii) determining, using a third set of rules and the common suspicious entities, one or more malicious entities.

7. The method according to claim 5, wherein the method comprises:
    (i) transferring, to a server processing system, data indicative of the one or more suspicious related entities; and
    (ii) receiving, from the server processing system, data indicative of whether at least some of the group is malicious.

8. The method according to claim 5, wherein at least one of the first rule, the second rule and the third rule comprise using at least one of:
    (i) statistical processes;
    (ii) fuzzy logic processes; and
    (iii) heuristical processes.

9. The method according to claim 5, wherein the at least one of the first rule, the second rule and the third rule are weighted according to a set of priorities.

10. The method according to claim 1, wherein the end condition is at least one of:
    (i) when no related entities are determined in a particular repetition;
    (ii) when no new related entities are determined in a particular repetition;
    (ii) when no related entities are determined in a period of time;
    (v) when the starting entity has an entity property which is indicative of the end condition; and
    (vi) when a selected number of repetitions have been performed.

11. The method according to claim 1, wherein the method comprises:
    (i) selecting, from a set of first rules and based on the entity property of the starting entity, a plurality of first rules; and (ii) determining, using the plurality of first rules, the at least one related entity relative to the starting entity.

12. A computer program product for determining a group of related entities of interest in one or more processing systems, the computer program product comprising a non-transitory computer-readable medium having instructions thereon, the instructions comprising:
   (a) code programmed to identify, using a second rule, a starting entity from one or more entities in the one or more processing systems, wherein the second rule comprises an event record indicative of at least one past event that occurred in the processing systems;
   (b) code programmed to obtain, based on an entity property of the starting entity, a first rule for identifying at least one related entity;
   (c) code programmed to identify, using the first rule, the at least one related entity relative to the starting entity;
   (d) code programmed to determine if an end condition is satisfied;
   (e) if the end condition is satisfied, code programmed to transfer data indicative of the at least one identified related entity to a server processing system;
   (f) if the end condition is not satisfied, code programmed to set the at least one related entity as the starting entity;
   (g) code programmed to repeat steps (b), (c), (d), (e), and (f) until the end condition is satisfied
   (h) code programmed to receive suspicious entity data indicative of one or more suspicious entities in the one or more processing systems;
   (i) code programmed to determine a quantity of malicious assessment rules satisfied by the one or more suspicious entities;
   (j) code programmed to assign a malicious value to the one or more suspicious entities based on the quantity of malicious assessment rules satisfied by the one or more suspicious entities, wherein the malicious value indicates a potential maliciousness of the one or more suspicious entities;
   (k) code programmed to determine, using a set of malicious assessment rules, the suspicious entity data, and the assigned malicious values, the one or more malicious entities;
   (l) code programmed to generate instructions for quarantining the one or more malicious entities on the one or more processing systems; and
   (m) code programmed to transfer, to the one or more processing systems, the instructions.

13. The method according to claim 1, wherein the method comprises the steps of:
   (i) receiving multiple records of suspicious entity data;
   (ii) determining common suspicious entities between the multiple records of the suspicious entity data; and
   (iii) determining, using the set of malicious assessment rules and the common suspicious entities, the one or more malicious entities.

14. The method according to claim 13, wherein the malicious assessment rules are weighted according to a set of priorities.

15. The method according to claim 1, wherein the method comprises transferring to the one or more processing systems instructions which are computer executable instructions.

16. A processing system to determine one or more malicious entities within one or more processing systems, wherein the processing system comprises:
   a processor;
   memory in electronic communication with the processor;
   the processor configured to:
   (a) identify, using a second rule, a starting entity from one or more entities in the one or more processing systems, wherein the second rule comprises an event record indicative of at least one past event that occurred in the processing systems;
   (b) obtain, based on an entity property of the starting entity, a first rule for identifying at least one related entity;
   (c) identify, using the first rule, the at least one related entity relative to the starting entity;
   (d) determine, by the processing system, if an end condition is satisfied;
   (e) if the end condition is not satisfied, setting the at least one related entity as the starting entity;
   (f) repeating steps (b), (c), (d), (e), and (f) until the end condition is satisfied;
   (g) if the end condition is satisfied, determine a quantity of malicious assessment rules satisfied by the at least one related entity;
   (h) assign a malicious value to the at least one related entity based on the quantity of malicious assessment rules satisfied by the at least one related entity, wherein the malicious value indicates a potential maliciousness of the at least one related entity;
   (i) determine, using a set of malicious assessment rules, the suspicious entity data, and the assigned malicious values, the at least one related entity; and
   (j) generate instructions for quarantining the one or more malicious entities on the one or more processing systems.

* * * * *